United States Patent
Nakayama et al.

(10) Patent No.: US 12,448,059 B2
(45) Date of Patent: Oct. 21, 2025

(54) DEFLECTOR DEVICE

(71) Applicant: KABUSHIKI KAISHA TOKAI-RIKA-DENKI-SEISAKUSHO, Aichi (JP)

(72) Inventors: Daisuke Nakayama, Aichi (JP); Nobuhiro Kudo, Aichi (JP); Kazuya Umino, Aichi (JP); Kazuyuki Yokoyama, Aichi (JP); Toshiya Ito, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 392 days.

(21) Appl. No.: 18/087,149

(22) Filed: Dec. 22, 2022

(65) Prior Publication Data
US 2023/0202296 A1  Jun. 29, 2023

(30) Foreign Application Priority Data
Dec. 24, 2021 (JP) .................... 2021-211525

(51) Int. Cl.
*B62D 35/00* (2006.01)
*B62D 37/02* (2006.01)

(52) U.S. Cl.
CPC .......... *B62D 35/005* (2013.01); *B62D 37/02* (2013.01)

(58) Field of Classification Search
CPC ....... B62D 35/005; B62D 35/02; B62D 37/02
See application file for complete search history.

(56) References Cited

U.S. PATENT DOCUMENTS

| | | | | |
|---|---|---|---|---|
| 11,022,188 B2* | 6/2021 | Nawabi | ............... | F16D 43/2026 |
| 11,155,312 B2* | 10/2021 | Shiga | ..................... | B62D 37/02 |
| 11,312,429 B2* | 4/2022 | Solazzo | ................. | B62D 27/04 |
| 11,891,128 B2* | 2/2024 | Tachi | ..................... | B62D 37/02 |
| 12,187,356 B2* | 1/2025 | Mizuno | ................. | B62D 35/02 |
| 12,221,170 B2* | 2/2025 | Umino | ................... | B62D 35/02 |
| 2016/0230820 A1 | 8/2016 | Matthews et al. | | |
| 2017/0120968 A1* | 5/2017 | Povinelli | ................ | B62D 37/02 |

(Continued)

FOREIGN PATENT DOCUMENTS

| | | |
|---|---|---|
| JP | 2016094073 A | 5/2016 |
| JP | 2016-528861 | 9/2016 |

(Continued)

OTHER PUBLICATIONS

Japanese Office Action (w/ English translation) for corresponding Application No. 2021-211525, mailed Nov. 12, 2024, 7 pages.

*Primary Examiner* — Gregory A Blankenship
(74) *Attorney, Agent, or Firm* — Dority & Manning, P.A.

(57) ABSTRACT

A deflector device includes a deflector body that is configured to be deployed in front of a front wheel of a vehicle by being rotated in a deploy direction and to suppress airflow onto the front wheel, and that is configured to be stowed in a body of the vehicle by being rotated in a stow direction; a drive member that is configured to transmit drive force; and a transmission member that is provided with a projection that protrudes in a radial direction thereof and that is configured to be engaged with the drive member such that drive force from the drive member is transmitted to the transmission member and the deflector body is rotated.

12 Claims, 8 Drawing Sheets

(56) References Cited

U.S. PATENT DOCUMENTS

| | | |
|---|---|---|
| 2017/0355403 A1 | 12/2017 | Grebel |
| 2018/0297646 A9* | 10/2018 | Povinelli ............... B62D 37/02 |
| 2018/0298953 A1 | 10/2018 | Andre et al. |
| 2019/0084628 A1 | 3/2019 | Povinelli et al. |
| 2019/0136948 A1* | 5/2019 | Palvoelgyi .............. F16D 7/044 |
| 2019/0211892 A1 | 7/2019 | Matthews et al. |
| 2019/0322323 A1* | 10/2019 | Andre ................. B62D 35/005 |
| 2020/0010128 A1* | 1/2020 | Herlem ................. B62D 35/02 |
| 2020/0154952 A1* | 5/2020 | Fenna ...................... A47K 3/30 |
| 2020/0189668 A1 | 6/2020 | Urbach et al. |
| 2020/0386282 A1 | 12/2020 | Matthews et al. |
| 2021/0139087 A1* | 5/2021 | Promutico ............. B62D 37/02 |
| 2021/0139088 A1* | 5/2021 | Tachi .................. B62D 35/005 |
| 2021/0269103 A1* | 9/2021 | Lindberg ............... B62D 37/02 |
| 2023/0065474 A1* | 3/2023 | Umino .................. B62D 37/02 |
| 2023/0143257 A1* | 5/2023 | Yokoyama ............ B62D 37/02 |
| | | 296/180.1 |
| 2023/0202585 A1* | 6/2023 | Nakayama ........... B62D 35/005 |
| | | 296/180.1 |
| 2023/0242184 A1* | 8/2023 | Yokoyama ............. B62D 35/02 |
| | | 296/180.1 |
| 2023/0242192 A1* | 8/2023 | Yokoyama ............. B62D 35/02 |
| | | 296/180.5 |
| 2023/0286599 A1* | 9/2023 | Matsumoto ........... B62D 37/02 |
| 2023/0339553 A1* | 10/2023 | Yoon ..................... B62D 35/02 |
| 2024/0051623 A1* | 2/2024 | Tachi ..................... B62D 35/02 |
| 2024/0051625 A1* | 2/2024 | Nakayama ............. B62D 35/02 |
| 2024/0308601 A1* | 9/2024 | Matsumoto .......... B62D 35/005 |
| 2024/0343323 A1* | 10/2024 | Yokoyama ............. B62D 35/02 |
| 2024/0383546 A1* | 11/2024 | Saito .................... B62D 35/005 |

FOREIGN PATENT DOCUMENTS

| | | |
|---|---|---|
| JP | 2019093785 A | 6/2019 |
| JP | 2020090278 A | 6/2020 |

* cited by examiner

DEFLECTOR DEVICE

CROSS-REFERENCE TO RELATED APPLICATION

This application claims priority under 35 USC 119 from Japanese Patent Application No. 2021-211525 filed Dec. 24, 2021, the disclosure of which is incorporated by reference herein in its entirety.

BACKGROUND

Technical Field

The present disclosure relates to a deflector device that suppresses airflow onto a front wheel of a vehicle.

Related Art

In a tightly sealed actuator described in Japanese National-Phase Publication No. 2016-528861, inclined teeth of a movable detent ring are meshed with an output detent ring, and also a supplemental channel of the movable detent ring is coupled to an output shaft such that the output shaft is rotated and a component is rotated by drive force being transmitted from the movable detent ring to the output detent ring.

There is a desire to make the movable detent ring in such a tightly sealed actuator more compact in an axial direction.

SUMMARY

In consideration of the above circumstances, an object of the present disclosure is to obtain a deflector device that enables a transmission member to be made more compact in an axial direction.

A deflector device of a first aspect of the present disclosure includes a deflector body, a drive member, and a transmission member. The deflector body is configured to be deployed in front of a front wheel of a vehicle by being rotated in a deploy direction and to suppress airflow onto the front wheel, and configured to be stowed in a body of the vehicle by being rotated in a stow direction. The drive member is configured to transmit drive force. The transmission member is provided with a projection that protrudes in a radial direction thereof and that is configured to be engaged with the drive member such that drive force from the drive member is transmitted to the transmission member and the deflector body is rotated.

A deflector device of a second aspect of the present disclosure includes a deflector body, a drive member, a transmission member, and a rotation member. The deflector body is configured to be deployed in front of a front wheel of a vehicle by being rotated in a deploy direction and to suppress airflow onto the front wheel, and configured to be stowed in a body of the vehicle by being rotated in a stow direction. The drive member is configured to transmit drive force. The transmission member is provided with a projection that is configured to be engaged with the drive member and that is provided with a coupling portion, a position of the coupling portion in an axial direction of the transmission member being aligned with the projection. The rotation member is configured to be coupled with the coupling portion and to be rotated by drive force that is transmitted from the drive member to the transmission member such that the deflector body is rotated.

A deflector device of a third aspect of the present disclosure is the deflector device of the first aspect or the second aspect of the present disclosure, further including a protruding portion protruding from the transmission member and integrated with the projection.

A deflector device of a fourth aspect of the present disclosure is the deflector device of any one of the first aspect to the third aspect of the present disclosure, further including an engaging portion provided at the drive member, the engaging portion is configured to open toward one side in a radial direction of the drive member such that the projection is engaged with the engaging portion.

A deflector device of a fifth aspect of the present disclosure is the deflector device of any one of the first aspect to the fourth aspect of the present disclosure, further including a movement portion provided at the drive member, the movement portion is configured to open toward one side in a radial direction of the drive member. The projection is moved at the movement portion in a case in which an external force acts on the deflector body and the transmission member is rotated.

In the deflector device of the first aspect of the present disclosure, the projection of the transmission member is configured to be engaged with the drive member such that drive force from the drive member is transmitted to the transmission member and the deflector body is rotated. Moreover, the deflector body is deployed in front of the front wheel of the vehicle by the deflector body being rotated in the deploy direction, suppressing airflow onto the front wheel. Alternatively, the deflector body is stowed in the vehicle body by the deflector body being rotated in the stow direction.

The projection protrudes in the radial direction of the transmission member. This accordingly enables the transmission member to be made more compact in the axial direction.

In the deflector device of the second aspect of the present disclosure, the projection of the transmission member is configured to be engaged with the drive member and the coupling portion of the transmission member is configured to be coupled with the rotation member, such that the rotation member is rotated by drive force that is transmitted from the drive member to the transmission member, and the deflector body is rotated.

Moreover, the deflector body is deployed in front of the front wheel of the vehicle by the deflector body being rotated in the deploy direction, suppressing airflow onto the front wheel. Alternatively, the deflector body is stowed in the vehicle body by the deflector body being rotated in the stow direction.

Positions of the projection and the coupling portion are aligned in the axial direction of the transmission member. This accordingly enables the transmission member to be made more compact in the axial direction.

In the deflector device of the third aspect of the present disclosure, the protruding portion is protruded from the transmission member, and the protruding portion is integrated to the projection. This accordingly enables the projection to be reinforced by the protruding portion.

In the deflector device of the fourth aspect of the present disclosure, the engaging portion is provided at the drive member, and the projection is engaged with the engaging portion.

The engaging portion is open toward one side in the radial direction of the drive member. This enables the projection to be disposed at one side in the radial direction of the drive member, enabling the axial direction dimensions of the drive member and the transmission member to be made small.

In the deflector device of the fifth aspect of the present disclosure, the movement portion is provided at the drive member, and the projection is moved at the movement portion in a case in which an external force acts on the deflector body and the transmission member is rotated.

The movement portion is open toward one side in the radial direction of the drive member. This accordingly enables the projection to be disposed at one side in the radial direction of the drive member, enabling the axial direction dimensions of the drive member and the transmission member to be made small.

DETAILED DESCRIPTION

First Exemplary Embodiment

Figure 1:
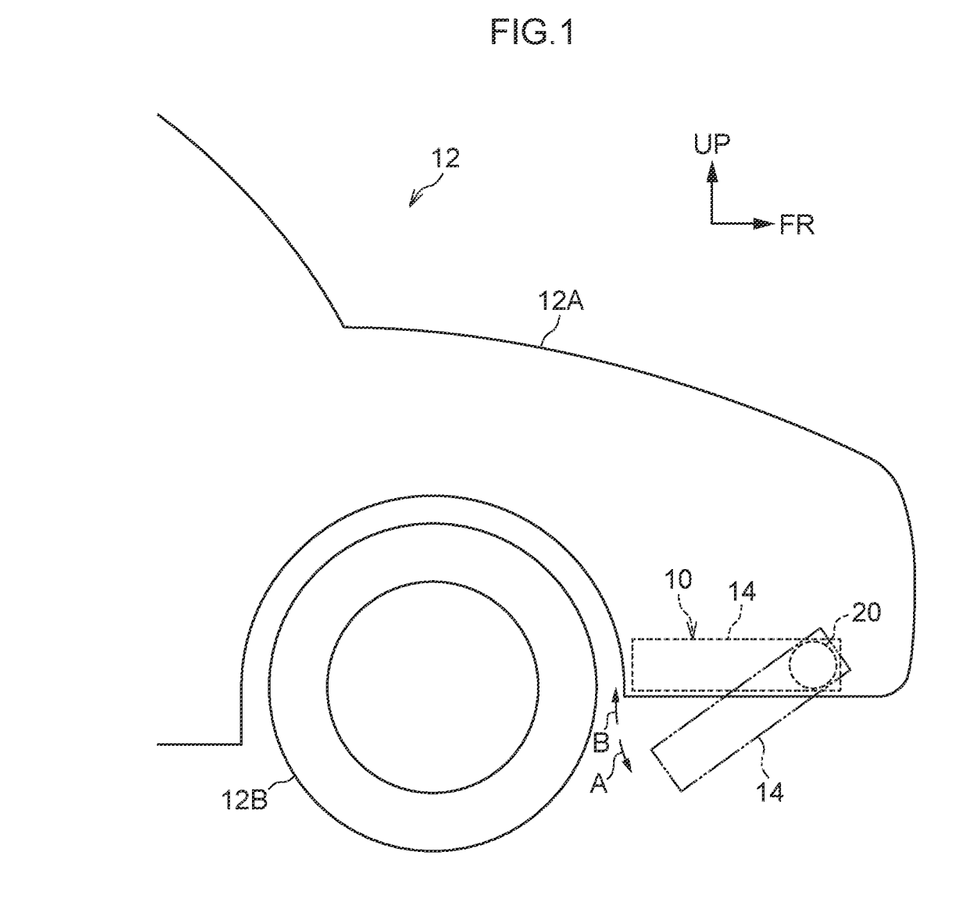
FIG. 1 is a side view illustrating a front section of a vehicle of a first exemplary embodiment of the present disclosure, as viewed from a vehicle width direction outer side.
Figure 2:
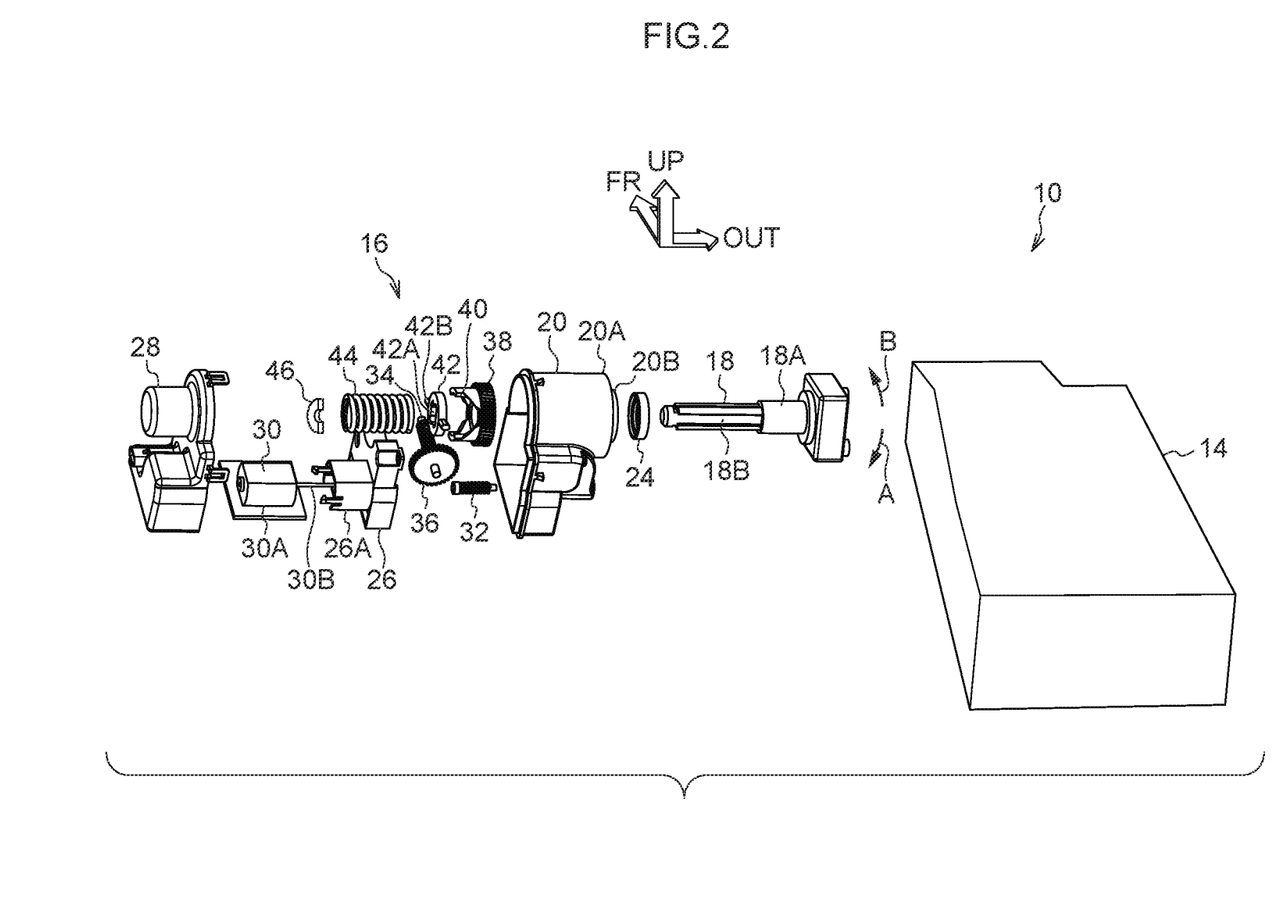
FIG. 2 is an exploded perspective view illustrating a deflector device according to the first exemplary embodiment of the present disclosure, as viewed from a vehicle rear and vehicle width direction inner side.

FIG. 1 is a side view illustrating a front section of a vehicle 12 of a first exemplary embodiment of the present disclosure, as viewed from an outer side in a vehicle width direction (vehicle right side), and FIG. 2 is an exploded perspective view illustrating a deflector device 10 according to the present exemplary embodiment, as viewed from the vehicle rear side and an inner side in the vehicle width direction. Note that in the drawings, the arrow FR indicates a vehicle front side, the arrow OUT indicates the vehicle width direction outer side (vehicle right side), and the arrow UP indicates the upper side.

As illustrated in FIG. 1, the deflector device 10 according to the present exemplary embodiment is installed inside a front end section of a vehicle body 12A, and is disposed at the front side of a front wheel 12B of the vehicle 12.

As illustrated in FIG. 1 and FIG. 2, a deflector body 14 (an air spat) made from resin in a substantially cuboidal box shape is provided in the deflector device 10, and the deflector body 14 is disposed at a stowed position (the broken line position in FIG. 1).

A drive device 16 (see FIG. 3 and FIG. 4) is assembled to a vehicle width direction inner side of the deflector body 14, with the drive device 16 being fixed to the front end inside of the vehicle body 12A.

Figure 3:
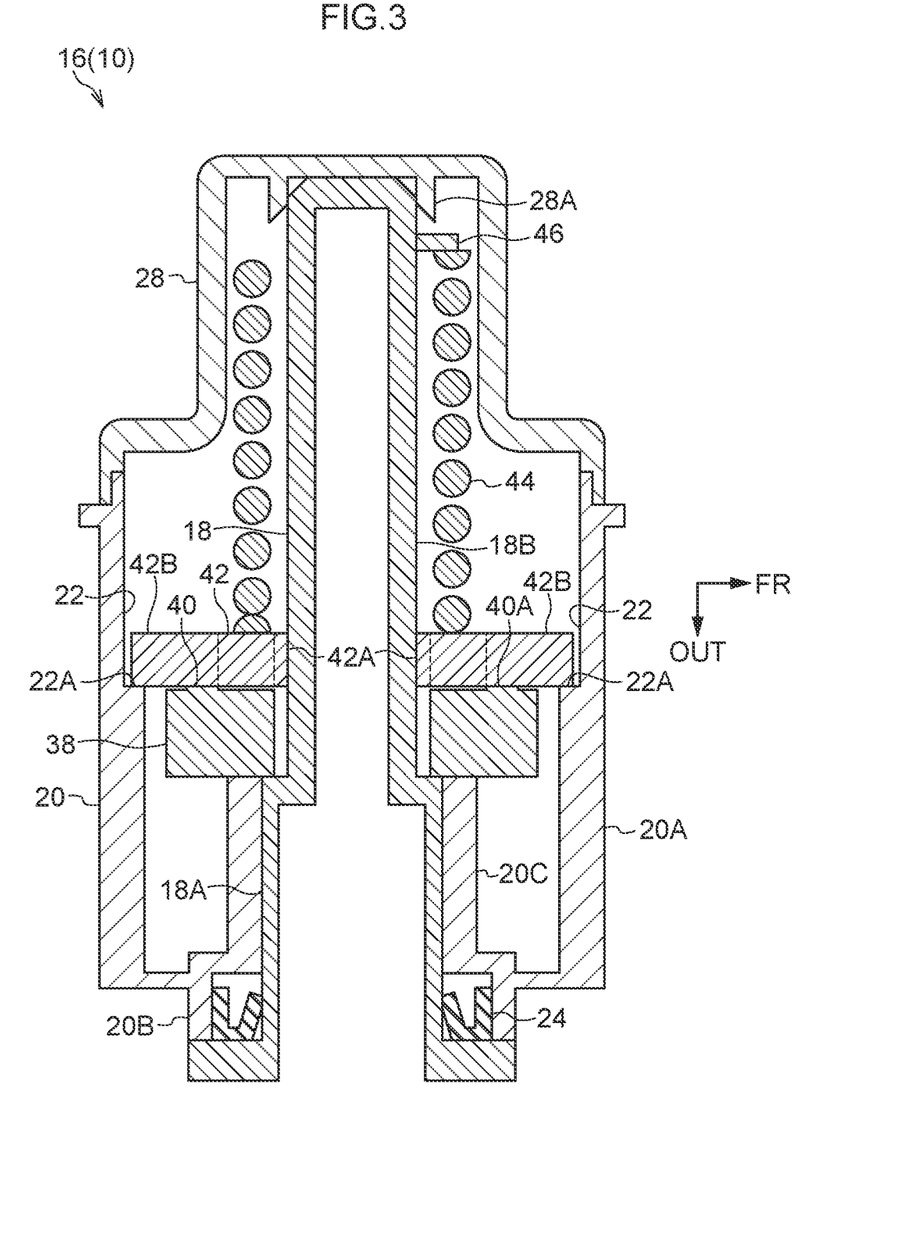
FIG. 3 is a cross-section of a drive device of a deflector device according to the first exemplary embodiment of the present disclosure, as viewed from above.
Figure 4:
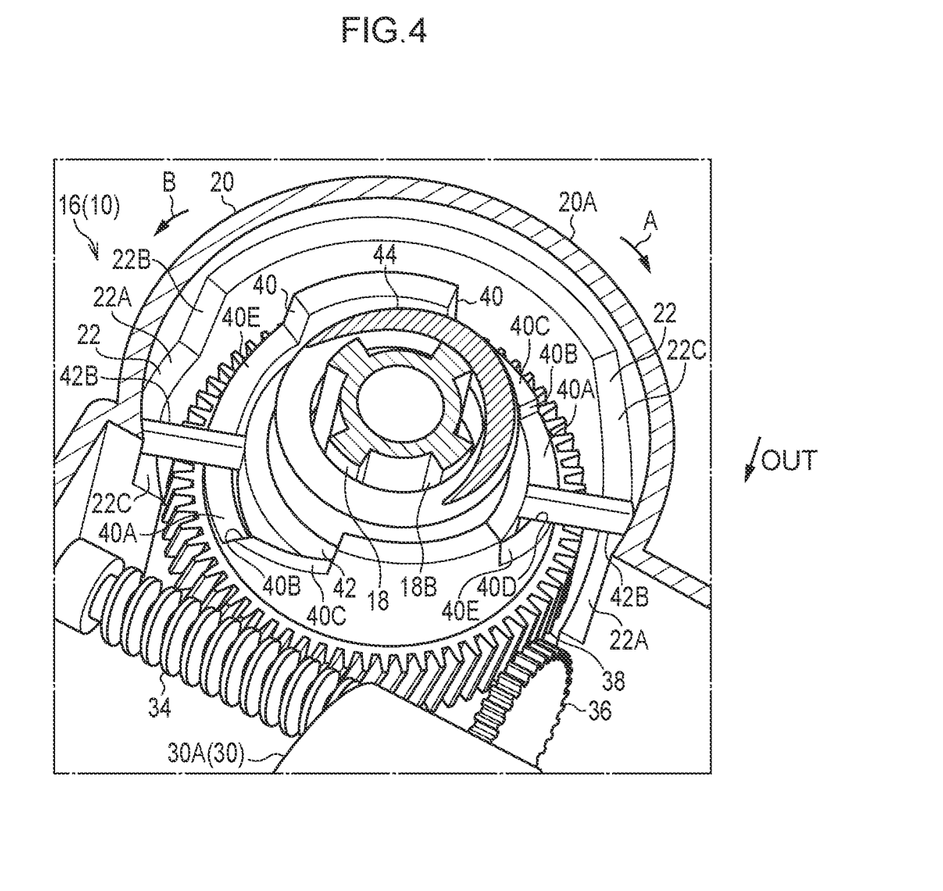
FIG. 4 is a perspective view illustrating a drive device of a deflector device according to the first exemplary embodiment of the present disclosure, as viewed from the vehicle width direction inner side.

A stand 18, serving as a rotating member, made from metal in a substantially circular cylinder shape is provided at the drive device 16, with the stand 18 having an axial direction oriented along the vehicle width direction, and enlarged in diameter at an enlarged diameter portion 18A coaxially provided at a vehicle width direction outer side portion thereof. A vehicle width direction outer side end portion of the stand 18 is coupled to a vehicle front side end portion of the deflector body 14, such that the deflector body 14 is capable of rotating in both a deploy direction A and a stow direction B about the stand 18 as a center axis.

At the outer periphery of the stand 18, a specific number (four in the present exemplary embodiment) of anchor grooves 18B having substantially rectangular cross-section shape and serving as a coupled-to portion are formed at a vehicle width direction inner side of the enlarged diameter portion 18A, with the specific number of anchor grooves 18B being arranged at a uniform spacing around the circumferential direction of the stand 18. The anchor grooves 18B are curved along the circumferential direction of the stand 18 and the anchor grooves 18B extend along the axial direction of the stand 18.

A case 20 made from resin in a box shape and serving as a support member configuring a support body is provided at the vehicle width direction inner side of the stand 18, with the inside of the case 20 open toward the vehicle width direction inner side. A housing tube 20A is formed in a substantially bottomed circular cylinder shape at an upper portion of the case 20, with the housing tube 20A having an axial direction oriented in the vehicle width direction and having an interior communicated with a lower portion of the case 20 interior.

A specific number (two in the present exemplary embodiment) of limit grooves 22 formed with trapezoidal shape in side view and serving as a limiting section are formed at an inner periphery of the housing tube 20A, with the specific number of the limit grooves 22 arranged at a uniform spacing around the circumferential direction of the housing tube 20A. The limit grooves 22 are curved along the circumferential direction of the housing tube 20A and open toward the vehicle width direction inner side and an inner side in the radial direction of the housing tube 20A. A pass face 22A is configured by an outside face in the vehicle width direction of each of the limit grooves 22, with the pass face 22A arranged orthogonally to an axial direction (vehicle width direction) of the housing tube 20A.

A deployment limit face 22B serving as a first limit section is configured by a face of each of the limit grooves 22 on the deploy direction A side, with the deployment limit face 22B arranged orthogonally to a circumferential direction of the housing tube 20A. A stow limit face 22C serving as a second limit section face is configured by a stow direction B side face of the limit groove 22, with the stow limit face 22C being inclined in a direction toward the vehicle width direction inner side on progression in the stow direction B. Note that the deployment limit face 22B should be provided at at least one of the limit grooves 22, and any of the limit grooves 22 not provided with the deployment limit face 22B may open in the deploy direction A.

A seal tube 20B formed in a bottomed circular cylinder shape and serving as a sealing section is integrally formed coaxially to a bottom wall (vehicle width direction outer side wall) of the housing tube 20A, with the axial direction of the seal tube 20B oriented in the vehicle width direction. The seal tube 20B pierces through the bottom wall of the housing tube 20A, with the inside of the seal tube 20B open toward the vehicle width direction outer side A support tube 20C formed in a circular cylinder shape and serving as a first support section is integrally formed coaxially to a bottom wall (vehicle width direction inner side wall) of the seal tube 20B, with the support tube 20C extending from the seal tube 20B toward the vehicle width direction inner side. A diameter of the support tube 20C is smaller than a diameter of the seal tube 20B, with the inside of the support tube 20C opening toward the inside of the seal tube 20B.

The enlarged diameter portion 18A of the stand 18 is inserted coaxially inside the seal tube 20B and inside the support tube 20C, with the stand 18 thereby being coaxially inserted inside the housing tube 20A. The enlarged diameter portion 18A is fitted together with the inside of the support tube 20C, with the support tube 20C rotatably supporting the stand 18. A seal ring 24 formed in a circular ring shape and serving as a seal member is provided between the seal tube 20B and the enlarged diameter portion 18A, with the seal ring 24 made from rubber and having sealing properties. The seal ring 24 is sandwiched and elastically compressed between the seal tube 20B and the enlarged diameter portion 18A, with the seal ring 24 sealing between the case 20 and the stand 18 and limiting the ingression of water into the case 20.

A motor base 26 made from resin and serving as a retaining member is fixed to a lower side portion of the inside of the case 20. A retention tube 26A having a substantially bottomed elliptical cylinder shape is integrally formed to the motor base 26, with the retention tube 26A protruding toward the vehicle width direction inner side and having an interior open toward the vehicle width direction inner side.

A cover 28 made from resin in a box shape and serving as a covering member configuring the support body is provided at the vehicle width direction inner side of the case 20 and the motor base 26, with the inside of the cover 28 open toward the vehicle width direction outer side. A vehicle width direction inner side end portion of the case 20 is fitted and fixed to a vehicle width direction outer side end portion of the cover 28, with the cover 28 covering the vehicle width direction inner side of the case 20 and the motor base 26. A supplementary tube 28A having a circular cylinder shape and serving as a second support section is integrally formed to an upper portion of a bottom wall (vehicle width direction inner side wall) of the cover 28, with the supplementary tube 28A protruding toward the vehicle width direction outer side. A vehicle width direction inner side end portion of the stand 18 is fitted inside the supplementary tube 28A, with the supplementary tube 28A rotatably supporting the stand 18. A vehicle width direction inner side end face of the stand 18 is abutted against the bottom wall of the cover 28.

The cover 28 and the case 20 are fixed to the inside of a front end portion of the vehicle body 12A, with the deflector device 10 thereby installed inside the front end section of the vehicle body 12A.

A motor 30 serving as a drive mechanism is provided at a lower portion of a space between the case 20 and the cover 28. A body section 30A having substantially elliptical pillar shaped is provided at the motor 30, with the body section 30A fitted inside the retention tube 26A of the motor base 26 from the vehicle width direction inner side and retained thereby. An output shaft 30B extends from the body section 30A toward the vehicle width direction outer side, with the output shaft 30B piercing through the motor base 26 and extending toward the vehicle width direction outer side of the motor base 26. The motor 30 is drivable such that the output shaft 30B is rotatable.

An initial-stage worm 32 made from resin is provided at the vehicle width direction outer side of the motor 30, with a vehicle width direction outer side end portion of the initial-stage worm 32 supported by a bottom wall (vehicle width direction outer side wall) of the case 20 so as to be able to rotate. The output shaft 30B of the motor 30 is coaxially inserted into the initial-stage worm 32 from the vehicle width direction inner side, with the initial-stage worm 32 being integrally rotated together with the output shaft 30B by rotation of the output shaft 30B.

An output worm 34 made from metal is provided at an upper side of the initial-stage worm 32, with the output worm 34 rotatably supported between the bottom wall of the case 20 and the motor base 26. An initial-stage gear 36 (worm wheel) made from resin is coaxially supported at a vehicle rear side of the output worm 34, with the initial-stage gear 36 integrally rotating together with the output worm 34. The initial-stage gear 36 is meshed with the initial-stage worm 32, and the initial-stage gear 36 and the output worm 34 are integrally rotated by rotation of the initial-stage worm 32.

An output gear 38 made from metal in a substantially circular cylinder shape and serving as a drive member is provided at an upper side of the output worm 34, with the stand 18 coaxially fitted inside the output gear 38, and the output gear 38 rotatably supported by the stand 18. The output gear 38 is configured so as to be able to move in a vehicle width direction (axial direction) with respect to the stand 18, with the output gear 38 abutted against the enlarged diameter portion 18A of the stand 18 and the support tube 20C of the case 20 from the vehicle width direction inner side. The output gear 38 is meshed with the output worm 34 at a vehicle width direction outer side portion (gear portion) thereof so as to have rotation limited thereby, and the output gear 38 is rotated by the output worm 34 being rotated.

A specific number (two in the present exemplary embodiment) of rotation grooves 40 having trapezoidal shapes in side view and serving as a rotation section are formed at vehicle width direction inner side portions of the output gear 38, with the specific number of rotation grooves 40 arranged at a uniform spacing around the circumferential direction of the output gear 38. The rotation grooves 40 are curved along the circumferential direction of the output gear 38, with the rotation grooves 40 open toward the vehicle width direction inner side and toward both sides in a radial direction of the output gear 38. A rotation face 40A is configured by a vehicle width direction outer side face of the rotation groove 40, with the rotation face 40A arranged orthogonally to the axial direction (vehicle width direction) of the output gear 38.

A deploy face 40B serving as a first rotation portion (engaging portion) is configured by face of the rotation groove 40 further to the stow direction B side than the rotation face 40A, with the deploy face 40B inclined in a direction toward the vehicle width direction inner side on progression in the stow direction B. A deploy allowance face 40C serving as a first allowance portion (movement portion)

is configured by a face of the rotation groove 40 further to the stow direction B side than the deploy face 40B, with the deploy allowance face 40C inclined in a direction toward the vehicle width direction inner side on progression in the stow direction B. A stow face 40D serving as a second rotation portion (engaging portion) is configured by a face of the rotation groove 40 further to the deploy direction A side than the rotation face 40A, with the stow face 40D inclined in a direction toward the vehicle width direction inner side on progression along the deploy direction A. A stow allowance face 40E serving as a second allowance portion (movement portion) is configured at a face of the rotation groove 40 further to the deploy direction A side than the stow face 40D, with the stow allowance face 40E inclined in a direction toward the vehicle width direction inner side on progression along the deploy direction A.

An angle of inclination of the deploy face 40B with respect to the circumferential direction of the output gear 38 is the same as an angle of inclination of the stow face 40D with respect to the circumferential direction of the output gear 38, and an angle of inclination of the deploy allowance face 40C with respect to the circumferential direction of the output gear 38 is the same as the angle of inclination of the stow allowance face 40E with respect to the circumferential direction of the output gear 38. The angle of inclination of the deploy face 40B and the stow face 40D with respect to the circumferential direction of the output gear 38 is larger than the angle of inclination of the deploy allowance face 40C and the stow allowance face 40E with respect to the circumferential direction of the output gear 38, and the angle of inclination of each of the deploy allowance faces 40C and the stow allowance faces 40E with respect to the circumferential direction of the output gear 38 is larger than the angle of inclination of each of the stow limit faces 22C of the case 20 (limit grooves 22) with respect to the circumferential direction of the housing tube 20A.

A clutch 42 made from metal in a substantially circular ring shape and serving as a transmission member is provided at the vehicle width direction inner side of the output gear 38, with the stand 18 fitting coaxially inside the clutch 42 and the clutch 42 supported by the stand 18. A specific number (four in the present exemplary embodiment) of anchor projections 42A having a substantially rectangular pillar shape, serving as coupling portions, are formed protruding from an inner periphery of the clutch 42, with the specific number of the anchor projections 42A arranged at a uniform spacing around the circumferential direction of the clutch 42. The anchor projections 42A are curved along the circumferential direction of the clutch 42, with the anchor projections 42A extending along the entire axial direction (vehicle width direction) of the clutch 42. The anchor projections 42A are inserted into (coupled to) the anchor grooves 18B of the stand 18 from the vehicle width direction inner side, and the anchor projections 42A are fitted together with the anchor grooves 18B in the circumferential direction of the clutch 42. The clutch 42 is accordingly able to rotate as one with the stand 18, and is also able to move along the axial direction with respect to the stand 18.

A specific number (two in the present exemplary embodiment) of arms 42B having a substantially rectangular pillar shape and serving as a projection are integrally formed to the outer side periphery of the clutch 42. Positions of the specific number of arms 42B in a clutch 42 axial direction (positions in the vehicle width direction) are aligned with positions of the anchor projections 42A in the clutch 42 axial direction. The arms 42B extend toward the radial direction outer side of the clutch 42, pass through the rotation grooves 40 of the output gear 38, and both side faces in the vehicle width direction of the arms 42B are curved to form a convex shape along the circumferential direction of the clutch 42. The arms 42B abut to the rotation faces 40A of the rotation grooves 40 from the vehicle width direction inner side and are abutted by the stow faces 40D of the rotation grooves 40. Furthermore, the arms 42B are arranged in the case 20 at the vehicle width direction inner side of the pass faces 22A of the limit grooves 22 and are also abutted by the stow limit faces 22C of the limit grooves 22.

A coil spring 44 made from metal and serving as an urging member is provided at the vehicle width direction inner side of the clutch 42, with the stand 18 coaxially inserted inside the coil spring 44. A C ring 46 having a C-shaped plate shape, made from metal, and serving as an anchor member is fitted over and fixed to the stand 18 in the vicinity of a vehicle width direction inner side end thereof, with the coil spring 44 spanning between the C ring 46 and the clutch 42. The coil spring 44 is compressible in an axial direction, and the coil spring 44 urges the clutch 42 and the output gear 38 toward the vehicle width direction outer side.

Next, description follows regarding operation of the present exemplary embodiment.

In the deflector device 10 configured as described above, in order to deploy the deflector body 14, the motor 30 in the drive device 16 is driven in the forward direction and the output shaft 30B, the initial-stage worm 32, the initial-stage gear 36, and the output worm 34 are rotated thereby, with the output gear 38 accordingly rotated in the deploy direction A, and the rotation faces 40A of the rotation grooves 40 in the output gear 38 being passed (slid) over by the arms 42B of the clutch 42. The deploy faces 40B of the rotation grooves 40 are then abutted (engaged) by the arms 42B, and the stand 18 is rotated in the deploy direction A by the clutch 42 being rotated in the deploy direction A, with the deflector body 14 being rotated in the deploy direction A (the output gear 38 transmitting drive force of the motor 30 to the clutch 42). Furthermore, the arms 42B of the clutch 42 are passed over the pass faces 22A of the limit grooves 22 in the case 20 and are abutted by the deployment limit faces 22B of the limit grooves 22, such that rotation of the clutch 42, the stand 18, and the deflector body 14 is limited in the deploy direction A, and the deflector body 14 is disposed in the deployed position (double-dot broken line position of FIG. 1).

The deflector body 14 is thereby disposed at the lower side of the vehicle body 12A and at the vehicle front side of the front wheel 12B of the vehicle 12, suppresses travel-induced wind (airflow) of the vehicle 12 from flowing onto the front wheel 12B (travel-induced wind flowing onto a lower side of the front wheel 12B), suppresses an increase in the air pressure from occurring at the vehicle front side of the front wheel 12B, and suppresses air resistance and lifting of the vehicle 12 from occurring.

In cases in which an external force of a specific value or greater from a bump in the road of travel of the vehicle 12 acts upward (in the stow direction B) on the deflector body 14 while the deflector body 14 is disposed at the deployed position, in the drive device 16 the arms 42B of the clutch 42 at the output gear 38 are moved (slid) against the urging force of the coil spring 44 from the deploy faces 40B of the rotation grooves 40 to the deploy allowance faces 40C. The clutch 42 is allowed to rotate in the stow direction B while being moved toward the vehicle width direction inner side, and rotation of the stand 18 and the deflector body 14 in the stow direction B is allowed, and the deflector body 14 and the drive device 16 are protected against the external force.

Then when the external force acting on the deflector body 14 is released, the arms 42B of the clutch 42 are moved (slid) by the urging force of the coil spring 44 from the deploy allowance faces 40C to the deploy faces 40B of the rotation grooves 40, the clutch 42 is rotated in the deploy direction A while being moved toward the vehicle width direction outer side, the stand 18 and the deflector body 14 are accordingly rotated in the deploy direction A, and the deflector body 14 is disposed (restored) to the deployed position.

Moreover, in order to stow the deflector body 14, the motor 30 in the drive device 16 is driven in reverse, and the output shaft 30B, the initial-stage worm 32, the initial-stage gear 36, and the output worm 34 are rotated such that the output gear 38 is rotated in the stow direction B, and the rotation faces 40A of the rotation grooves 40 in the output gear 38 are passed (slid) over by the arms 42B of the clutch 42. The stow faces 40D of the rotation grooves 40 are then abutted (engaged) by the arms 42B, the stand 18 is rotated in the stow direction B by the clutch 42 being rotated in the stow direction B, and the deflector body 14 is rotated in the stow direction B (the output gear 38 transmitting drive force of the motor 30 to the clutch 42). Furthermore, the arms 42B of the clutch 42 are passed over the pass faces 22A of the limit grooves 22 in the case 20, and are abutted by the stow limit faces 22C of the limit grooves 22, such that the clutch 42, the stand 18, and the deflector body 14 are limited from rotating in the stow direction B. and the deflector body 14 is disposed in the stowed position (the broken line position of FIG. 1).

In cases in which an external force of a defined value or greater from a bump in the road of travel of the vehicle 12 has acted upward (in the stow direction B) on the deflector body 14 while the deflector body 14 is disposed at the stowed position, in the drive device 16 the arms 42B of the clutch 42 are moved (slid) over the stow limit faces 22C of the limit grooves 22 in the case 20 (the stowage tube 20A) against the urging force of the coil spring 44, and the clutch 42 is allowed to rotate in the stow direction B by the clutch 42 moving toward the vehicle width direction inner side, rotation of the stand 18 and the deflector body 14 in the stow direction B is allowed, and the deflector body 14 and the drive device 16 are protected against the external force.

Then when the action of external force on the deflector body 14 has been released, the arms 42B of the clutch 42 are slid (moved) against the stow limit faces 22C of the limit grooves 22 by the urging force of the coil spring 44 and the clutch 42 is rotated in the deploy direction A while being moved toward the vehicle width direction outer side, such that the stand 18 and the deflector body 14 are rotated in the deploy direction A, and the deflector body 14 is disposed (restored) to the stowed position.

In a case in which, supposing, external force of the specific value or greater has acted downward (in the deploy direction A) on the deflector body 14 while the deflector body 14 is disposed at the stowed position, at the drive device 16 the arms 42B of the clutch 42 are moved (slid) against urging force of the coil spring 44 from the stow face 40D of the rotation grooves 40 in the output gear 38 to the stow allowance face 40E thereof and the clutch 42 is allowed to rotate in the deploy direction A while being moved toward the vehicle width direction inner side, such that rotation of the stand 18 and the deflector body 14 in the deploy direction A is allowed, and the deflector body 14 and the drive device 16 are protected against the external force.

Then when the action of the external force on the deflector body 14 has been released, the arms 42B of the clutch 42 are moved (slid) from the stow allowance face 40E of the rotation grooves 40 to the stow face 40D thereof by the urging force of the coil spring 44 and the clutch 42 is rotated in the stow direction B while being moved toward the vehicle width direction outer side, the stand 18 and the deflector body 14 are rotated in the stow direction B, and the deflector body 14 is disposed (restored) to the stowed position.

The arms 42B of the clutch 42 protrude toward the radial direction outside of the clutch 42. Thus, in contrast to a case in which the arms 42B protrude in an axial direction of the clutch 42, the clutch 42 can be made more compact in the axial direction (vehicle width direction), and the drive device 16 can be made more compact in the vehicle width direction.

Positions of the arms 42B of the clutch 42 are aligned in the axial direction of the clutch 42 with the anchor projections 42A. Thus, in contrast to a case in which positions of the arms 42B in the clutch 42 axial direction are not aligned with the anchor projections 42A, the clutch 42 can be made more compact in the axial direction (vehicle width direction), and the drive device 16 can be made more compact in the vehicle width direction.

Moreover, all of the arms 42B of the clutch 42 are aligned with the anchor projections 42A of the clutch 42 in the clutch 42 axial direction. The clutch 42 can accordingly be made even more compact in the axial direction, and the strength of the arms 42B can be raised.

Second Exemplary Embodiment

Figure 5:
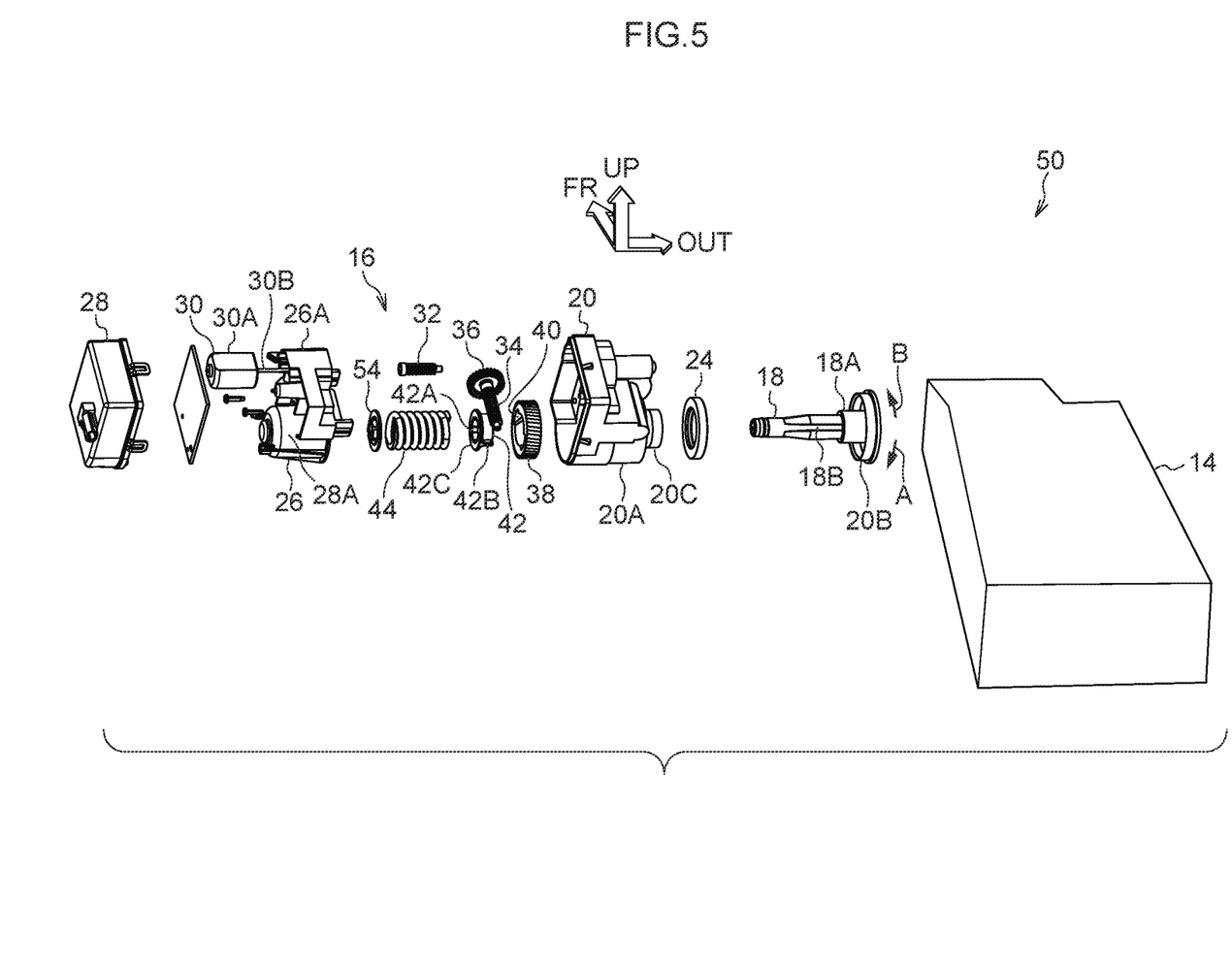
FIG. 5 is an exploded perspective view illustrating a deflector device according to a second exemplary embodiment of the present disclosure, as viewed from a vehicle rear and vehicle width direction inner side.
Figure 6:
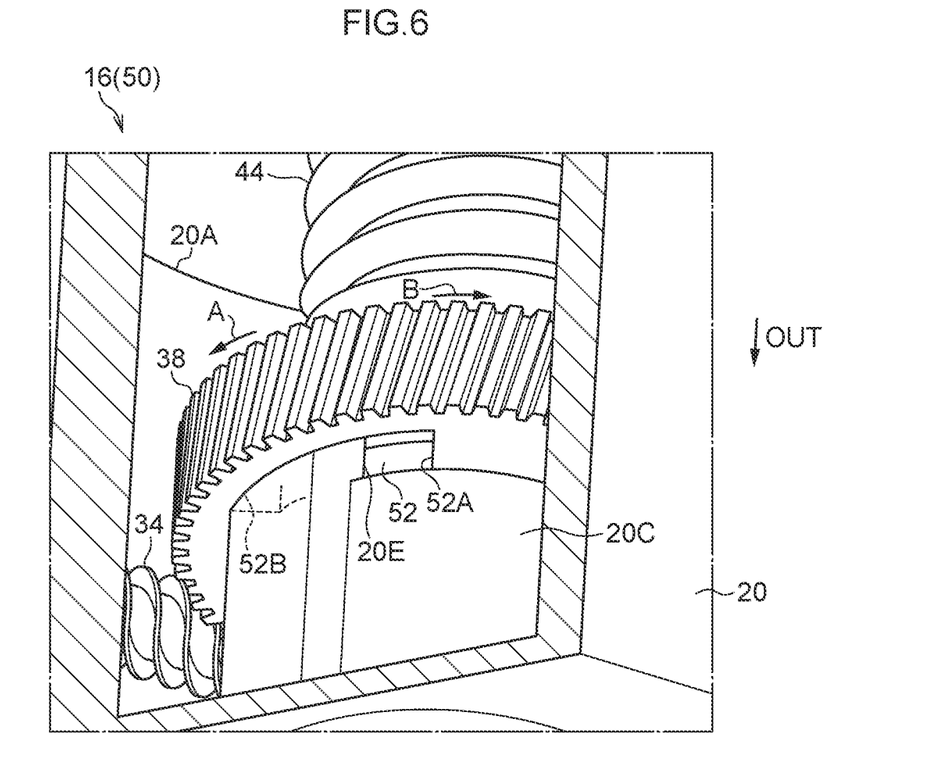
FIG. 6 is a perspective view illustrating a drive device of a deflector device according to the second exemplary embodiment of the present disclosure, as viewed from the vehicle width direction outer side.

FIG. 5 illustrates a cross-section of a drive device 16 of a deflector device 50 according to a second exemplary embodiment of the present disclosure, as viewed from above. Furthermore, FIG. 6 is a perspective view illustrating the drive device 16 of the deflector device 50 as viewed from the vehicle width direction outer side, and FIG. 7 is a perspective view illustrating the drive device 16 of the deflector device 50, as viewed from the vehicle width direction inner side.

The deflector device 50 according to the present exemplary embodiment has a configuration similar to that of the first exemplary embodiment, but differs in the following points.

Figure 7A:
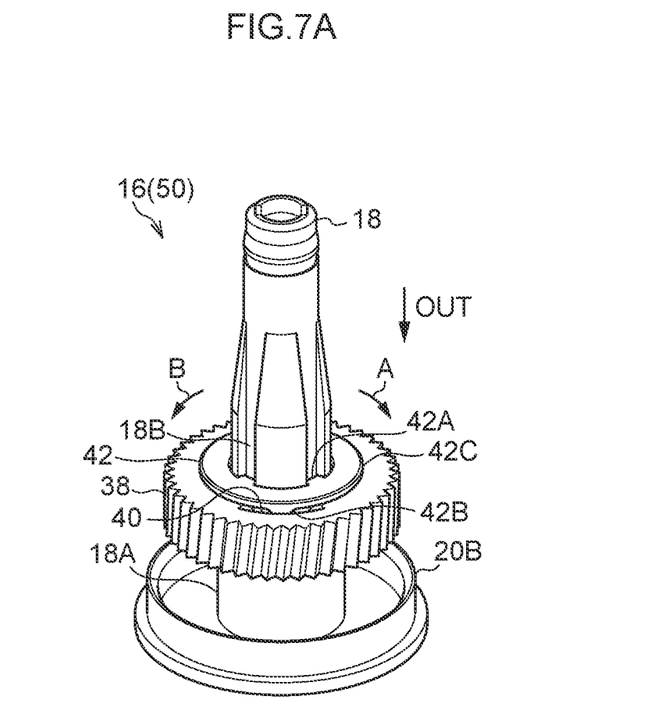
FIG. 7A is a perspective view illustrating a stand, an output gear, and a clutch of a deflector device according to the second exemplary embodiment of the present disclosure.
Figure 7B:
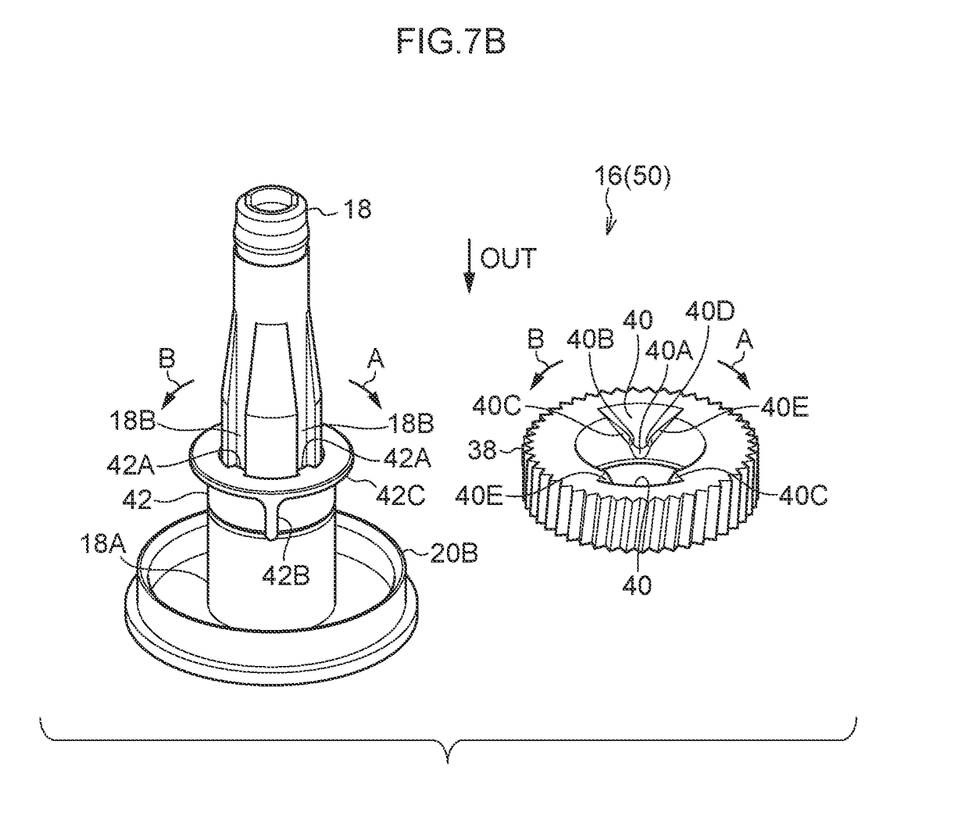
FIG. 7B is an exploded perspective view illustrating a stand, an output gear, and a clutch of a deflector device according to the second exemplary embodiment of the present disclosure.

As illustrated in FIG. 5, in the drive device 16 of the deflector device 50 according to the present exemplary embodiment, the seal tube 20B is integrally formed coaxially to a vehicle width direction outer side end portion of the stand 18, and the interior of the seal tube 20B is open toward the vehicle width direction inner side (see FIG. 7A and FIG. 7B).

The housing tube 20A is provided at a lower portion of the case 20, with an interior of the housing tube 20A communicated with an upper portion of the case 20 interior. The limit grooves 22 of the first exemplary embodiment are not provided at the housing tube 20A.

As illustrated in FIG. 5 and FIG. 6, the support tube 20C of the case 20 is integrally formed coaxially to a bottom wall (vehicle width direction outer side wall) of the housing tube 20A, with the support tube 20C piercing through the bottom wall of the housing tube 20A and the interior of the support tube 20C open toward the vehicle width direction outer side.

A seal ring 24 is provided between the support tube 20C and the seal tube 20B of the stand 18, with the seal ring 24 sandwiched and elastically compressed between the support tube 20C and the seal tube 20B. The seal ring 24 accordingly seals between the case 20 and the stand 18 and limits the ingression of water into the case 20.

A specific number (two in the present exemplary embodiment) of restricting plates 20E having a substantially rectangular plate shape and serving as a restricting section are integrally formed to an outer periphery of the support tube 20C, with the specific number of the restricting plates 20E arranged at a uniform spacing around the circumferential direction of the stowage tube 20A, and with each of the restricting plates 20E respectively curved along the stowage tube 20A circumferential direction. The restricting plates 20E extend along the axial direction (vehicle width direction) of the support tube 20C, with the restricting plates 20E being integrated to a bottom wall of the housing tube 20A and also protruding toward the vehicle width direction inside of the support tube 20C.

A motor base 26 is fixed inside the case 20, with a retention tube 26A integrally formed to an upper portion of the motor base 26. A supplementary tube 28A (see FIG. 3) is integrally formed to a lower portion of the motor base 26, with a width direction inside end portion of the stand 18 fitted inside the supplementary tube 28A and the supplementary tube 28A rotatably supporting the stand 18. A vehicle width direction inner side end face of the stand 18 is abutted by the motor base 26.

The motor 30 is provided to an upper portion of a space between the case 20 and the cover 28, with an initial-stage worm 32 provided at a vehicle width direction outside of the motor 30. An output worm 34 is provided at a lower side of the initial-stage worm 32, and an initial-stage gear 36 is supported at a vehicle front side of the output worm 34.

The output gear 38 is provided at a lower side of the output worm 34. A specific number (two in the present exemplary embodiment) of restriction grooves 52 having a substantially elongated rectangular shape and serving as a restricted section are formed at a vehicle width direction outer side portion of the output gear 38, with the specific number of the restriction grooves 52 arranged at a uniform spacing around the circumferential direction of the output gear 38. The restriction grooves 52 are curved along the circumferential direction of the output gear 38, and the restriction grooves 52 are open toward the vehicle width direction outer side. A deploy restriction face 52A serving as a first restricted section is configured by a face on a stow direction B side of each of the restriction grooves 52, with the deploy restriction face 52A being disposed orthogonal to a circumferential direction of the output gear 38. A stow restriction face 52B serving as a second restricted section is configured by a face on a deploy direction A side of each of the restriction grooves 52, with the stow restriction face 52B being arranged orthogonal to the circumferential direction of the output gear 38. The restricting plates 20E of the case 20 are inserted into the restriction grooves 52 from the vehicle width direction outer side, and the restricting plates 20E are abutted against the stow restriction faces 52B.

A specific number of rotation grooves 40 (see FIG. 7A and FIG. 7B) are formed to an inner periphery of the output gear 38, with the rotation grooves 40 open toward the vehicle width direction inner side and toward the inner side in the radial direction of the output gear 38. In each of the rotation grooves 40, a dimension of the rotation face 40A in a circumferential direction of the output gear 38 is small, and the deploy face 40B and the deploy allowance face 40C are close to the stow face 40D and the stow allowance face 40E in the output gear 38 circumferential direction. The rotation face 40A is curved in a convex shape along the output gear 38 circumferential direction.

The clutch 42 (see FIG. 7A and FIG. 7B) has a substantially circular cylinder shape, with the clutch 42 fitted coaxially inside the output gear 38 and rotatably supported by the output gear 38. The arms 42B of the clutch 42 are configured with a small extension dimension and extend along the axial direction (vehicle width direction) of the clutch 42, with vehicle width direction outer side end face of each of the arms 42B curved in a convex shape along the clutch 42 circumferential direction, and with a vehicle width direction outer side end portion of each of the arms 42B abutted by the rotation face 40A, the stow face 40D, and the deploy face 40B of the respective rotation groove 40. A flange 42C having a circular ring shape and serving as a protruding portion is integrally formed coaxially to a vehicle width direction inner side end portion of the clutch 42, with the flange 42C protruding toward the radial direction outer side of the clutch 42. The flange 42C is abutted from the vehicle width direction inner side by the output gear 38, with the arms 42B integrated to the flange 42C.

Instead of the C ring 46 of the first exemplary embodiment, a push nut 54 that is made from metal, has a substantially circular ring plate shape, and serves as an anchor member, is fitted and fixed to the stand 18 at a vicinity of a vehicle width direction inner side end portion thereof, with a coil spring 44 spanning between the push nut 54 and the clutch 42 (including the flange 42C).

The present exemplary embodiment is able to exhibit similar operation and advantageous effects to those of the first exemplary embodiment described above.

In particular, in order to deploy the deflector body 14, the motor 30 in the drive device 16 is driven in the forward direction and the output shaft 30B, the initial-stage worm 32, the initial-stage gear 36, and the output worm 34 are rotated such that the output gear 38 is rotated in the deploy direction A. The deploy faces 40B of the rotation grooves 40 in the output gear 38 accordingly press the arms 42B of the clutch 42 (engage with the arms 42B), and the stand 18 is rotated in the deploy direction A by the clutch 42 being rotated in the deploy direction A (the output gear 38 transmits drive force of the motor 30 to the clutch 42), and the deflector body 14 is rotated in the deploy direction A. Furthermore, the restriction grooves 52 of the output gear 38 are rotated in the deploy direction A, and rotation of the output gear 38, the clutch 42, the stand 18, and the deflector body 14 is limited in the deploy direction A due to the deploy restriction face 52A of each of the restriction grooves 52 being abutted by the respective restricting plate 20E of the case 20, and the deflector body 14 is disposed in the deployed position (the double-dot broken line position of FIG. 1).

In a case in which, supposing, external force of the specific value or greater has acted downward (in the deploy direction A) on the deflector body 14 while the deflector body 14 is being disposed at the deployed position, then at the drive device 16 each of the arms 42B of the clutch 42 is moved (slid) against urging force of the coil spring 44 from the stow face 40D to the stow allowance face 40E of the respective rotation groove 40 in the output gear 38, and the clutch 42 is allowed to rotate along the deploy direction A by moving toward the width direction inner side, such that rotation of the stand 18 and the deflector body 14 is allowed in the deploy direction A, and the deflector body 14 and the drive device 16 are protected against the external force.

Then, when action of the external force on the deflector body 14 has been released, each of the arms 42B of the clutch 42 is moved (slid) by urging force of the coil spring 44 from the stow allowance face 40E to the stow face 40D of the respective rotation groove 40 and the clutch 42 is rotated in the stow direction B while being moved toward the vehicle width direction outer side, such that the stand 18 and the deflector body 14 are rotated in the stow direction B, and the deflector body 14 is disposed (restored) to the deployed position.

Moreover, in order to stow the deflector body 14, the motor 30 in the drive device 16 is driven in reverse, and the output shaft 30B, the initial-stage worm 32, the initial-stage gear 36, and the output worm 34 are rotated such that the output gear 38 is rotated in the stow direction B. In the output gear 38 the stow faces 40D of the rotation grooves 40 press the arms 42B of the clutch 42 (engage with the arms 42B) and the clutch 42 is rotated in the stow direction B (the output gear 38 transmitting the drive force of the motor 30 to the clutch 42), and the stand 18 is rotated in the stow direction B and the deflector body 14 is rotated in the stow direction B. Furthermore, the restriction grooves 52 of the output gear 38 are rotated in the stow direction B, the stow restriction face 52B of each of the restriction grooves 52 is abutted against the respective restricting plate 20E of the case 20 such that rotation of the output gear 38, the clutch 42, the stand 18, and the deflector body 14 is limited in the stow direction B. and the deflector body 14 is disposed in the stowed position (broken line position of FIG. 1).

In cases in which an external force from a bump in the road of travel of the vehicle 12 of a specific value or greater has acted on the deflector body 14 upward (in the stow direction B) while the deflector body 14 is being disposed in the stowed position, in the drive device 16, the arms 42B of the clutch 42 are each moved (slid) against urging force of the coil spring 44 from the deploy face 40B to the deploy allowance face 40C of the respective rotation groove 40 in the output gear 38, and rotation of the clutch 42 toward the stow direction B is allowed by the clutch 42 moving toward the vehicle width direction inner side, such that rotation of the stand 18 and the deflector body 14 toward the stow direction B is allowed, and the deflector body 14 and the drive device 16 are protected against the external force.

Then when action of the external force on the deflector body 14 has been released, the arms 42B of the clutch 42 are each moved (slid) by urging force of the coil spring 44 from the deploy allowance face 40C to the deploy face 40B of the respective rotation groove 40, and the clutch 42 is rotated in the deploy direction A while being moved toward the vehicle width direction outer side, such that the stand 18 and the deflector body 14 are rotated in the deploy direction A, and the deflector body 14 is disposed (restored) to the stowed position.

Moreover, the arms 42B of the clutch 42 protrude toward the radial direction outer side of the clutch 42, and the rotation face 40A, the deploy face 40B, and the stow face 40D of the output gear 38 are open toward the inner side in the radial direction of the output gear 38. This enables the arms 42B to be inserted inside the output gear 38 (enables the arms 42B to be disposed at the radial direction inside of the output gear 38), enabling dimensions in the axial direction (vehicle width direction) of the output gear 38 and the clutch 42 to be set small, and enabling the drive device 16 to be made more compact in the vehicle width direction.

Furthermore, the arms 42B of the clutch 42 protrude toward the radial direction outer side of the clutch 42, and the deploy allowance faces 40C and the stow allowance faces 40E of the output gear 38 are open toward an inner side in the radial direction of the output gear 38. This enables the arms 42B to be inserted even more inside the output gear 38, enables the axial direction (vehicle width direction) dimensions of the output gear 38 and the clutch 42 to be made even smaller, and enables the drive device 16 to be made even smaller in the vehicle width direction.

Moreover, the rotation faces 40A, the deploy faces 40B, and the stow faces 40D are provided at the inner periphery of the output gear 38. This thereby enables the axial direction (vehicle width direction) dimension of the output gear 38 to be made small, and enables the drive device 16 to be made even more compact in the vehicle width direction.

Furthermore, the deploy allowance faces 40C and the stow allowance faces 40E are provided at the inner periphery of the output gear 38. This thereby enables the axial direction (vehicle width direction) dimension of the output gear 38 to be made even smaller, and enables the drive device 16 to be made even more compact in the vehicle width direction.

In the clutch 42 the arms 42B is integrated to the flange 42C. The arms 42B can accordingly be reinforced by the flange 42C, enabling an increase in the strength of the arms 42B.

Note that in the present exemplary embodiment the arms 42B of the clutch 42 protrude to the radial direction outer side of the clutch 42, and the rotation grooves 40 (the rotation face 40A, the deploy face 40B, the deploy allowance face 40C, the stow face 40D, and the stow allowance face 40E) of the output gear 38 are open toward the inner side in the radial direction of the output gear 38. However, the arms 42B of the clutch 42 may be configured to protrude toward an inner side in the clutch 42 radial direction and the rotation grooves 40 (the rotation faces 40A, the deploy faces 40B, the deploy allowance faces 40C, the stow faces 40D, and the stow allowance faces 40E) of the output gear 38 may be configured to open toward an outer side in the radial direction of the output gear 38.

Note that in the first exemplary embodiment and the second exemplary embodiment there are two each provided for the limit grooves 22 of the case 20, the rotation grooves 40 of the output gear 38, and the arms 42B of the clutch 42. However, one or three or more (for example three or four) may be provided for each of the limit grooves 22 of the case 20, the rotation grooves 40 of the output gear 38, and the arms 42B of the clutch 42.

What is claimed is:

1. A deflector device, comprising:
   a deflector body configured to be deployed in front of a front wheel of a vehicle by being rotated in a deploy direction and to suppress airflow onto the front wheel, and configured to be stowed in a body of the vehicle by being rotated in a stow direction;
   a drive member configured to transmit drive force; and
   a transmission member provided with a projection that protrudes in a radial direction thereof and that is configured to be engaged with the drive member such that drive force from the drive member is transmitted to the transmission member and the deflector body is rotated, wherein:
   the drive member is disposed at an outer side, in the radial direction, of a substantially annular part of the transmission member.

2. A deflector device, comprising:
   a deflector body configured to be deployed in front of a front wheel of a vehicle by being rotated in a deploy direction and to suppress airflow onto the front wheel, and configured to be stowed in a body of the vehicle by being rotated in a stow direction;
   a drive member configured to transmit drive force;
   a transmission member provided with a projection that is configured to be engaged with the drive member and the transmission member provided with a coupling portion, a position of the coupling portion in an axial direction of the transmission member being aligned with the projection; and a rotation member configured to be coupled with the coupling portion and to be rotated by drive force that is transmitted from the drive member to the transmission member such that the deflector body is rotated, wherein:

the drive member is disposed at an outer side, in a radial direction, of a substantially annular part of the transmission member.

3. The deflector device of claim 1, further comprising a protruding portion protruding from the transmission member and integrated with the projection.

4. The deflector device of claim 2, further comprising a protruding portion protruding from the transmission member and integrated with the projection.

5. The deflector device of claim 1, further comprising an engaging portion provided at the drive member, the engaging portion being configured to open toward one side in a radial direction of the drive member such that the projection is engaged with the engaging portion.

6. The deflector device of claim 2, further comprising an engaging portion provided at the drive member, the engaging portion being configured to open toward one side in a radial direction of the drive member such that the projection is engaged with the engaging portion.

7. The deflector device of claim 1, further comprising a movement portion provided at the drive member, the movement portion being configured to open toward one side in a radial direction of the drive member, wherein the projection is moved at the movement portion in a case in which an external force acts on the deflector body and the transmission member is rotated.

8. The deflector device of claim 2, further comprising a movement portion provided at the drive member, the movement portion being configured to open toward one side in a radial direction of the drive member, wherein the projection is moved at the movement portion in a case in which an external force acts on the deflector body and the transmission member is rotated.

9. The deflector device of claim 1, wherein:
the transmission member is substantially circular ring-shaped, and
the projection protrudes from an outer circumference toward an outer side, in the radial direction, of the transmission member.

10. The deflector device of claim 2, wherein:
the transmission member is substantially circular ring-shaped, and
the projection protrudes from an outer circumference toward an outer side, in the radial direction, of the transmission member.

11. The deflector device of claim 1, wherein the projection is protruded further outer side, in the radial direction, than the driving member.

12. The deflector device of claim 2, wherein the projection is protruded further outer side, in the radial direction, than the driving member.

* * * * *